United States Patent
Jung et al.

(10) Patent No.: US 7,281,572 B2
(45) Date of Patent: Oct. 16, 2007

(54) HEAT EXCHANGER COMPRISING A CONNECTION FLANGE THAT IS JOINED TO THE MANIFOLD

(75) Inventors: Patrick Jung, Roth (FR); Fabrice Kaczmarek, Saverne (FR); Frédéric Seibert-Sandt, Metz (FR)

(73) Assignee: Behr France Hambach, Hambach (FR)

( * ) Notice: Subject to any disclaimer, the term of this patent is extended or adjusted under 35 U.S.C. 154(b) by 68 days.

(21) Appl. No.: 10/542,706

(22) PCT Filed: Jan. 19, 2004

(86) PCT No.: PCT/EP2004/000364

§ 371 (c)(1),
(2), (4) Date: Jul. 20, 2005

(87) PCT Pub. No.: WO2004/065883

PCT Pub. Date: Aug. 5, 2004

(65) Prior Publication Data

US 2006/0118289 A1    Jun. 8, 2006

(30) Foreign Application Priority Data

Jan. 20, 2003    (EP)    ................... 03290137

(51) Int. Cl.
*F28F 9/04*    (2006.01)
(52) U.S. Cl. ................... 165/178; 165/153; 165/173

(58) Field of Classification Search ........ 165/151–153, 165/172, 173, 178
See application file for complete search history.

(56) References Cited

U.S. PATENT DOCUMENTS

| 5,163,716 | A |   | 11/1992 | Bolton et al. |
| 5,363,910 | A |   | 11/1994 | Baba et al. |
| 5,526,876 | A | * | 6/1996 | Karube ................... 165/176 |
| 5,937,939 | A | * | 8/1999 | Inaba et al. ............. 165/178 |
| 5,950,713 | A | * | 9/1999 | Kato ...................... 165/76 |
| 6,038,884 | A |   | 3/2000 | Dabrowski |
| 6,199,401 | B1 | * | 3/2001 | Haussmann ............. 62/525 |
| 6,347,663 | B1 | * | 2/2002 | Hunzinger et al. ...... 165/178 |
| 2002/0014327 | A1 | * | 2/2002 | Sasaki .................... 165/178 |

FOREIGN PATENT DOCUMENTS

| EP | 0 915 308 A1 | 5/1999 |
| EP | 1 150 088 A2 | 10/2001 |
| EP | 1 167 897 A1 | 1/2002 |

* cited by examiner

*Primary Examiner*—Teresa J. Walberg
(74) *Attorney, Agent, or Firm*—Foley & Lardner LLP

(57) ABSTRACT

A heat exchanger having tubes and at least one collecting tube is used, especially for air conditioning units of motor vehicles. The heat exchanger has pipes, at least one manifold that communicates with the pipes, and at least one connection flange. The connection flange is connected in a communicating manner to the manifold via a nozzle and can be connected to a conduit.

9 Claims, 3 Drawing Sheets

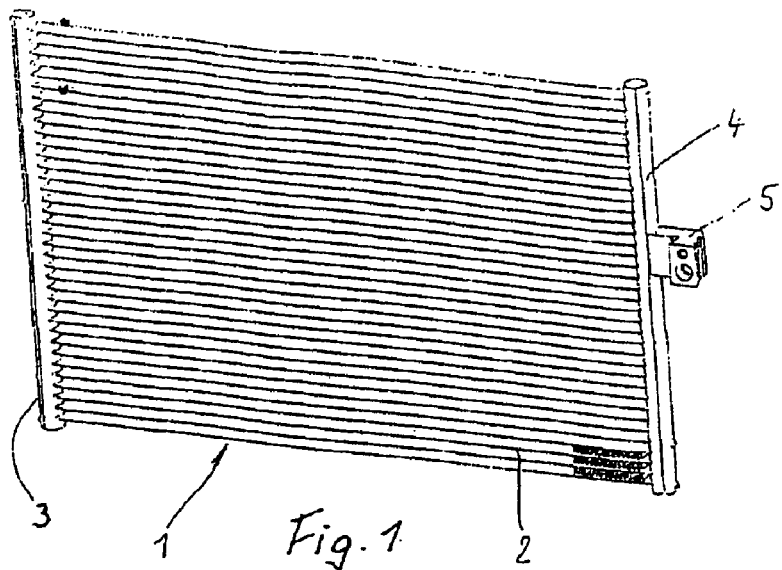
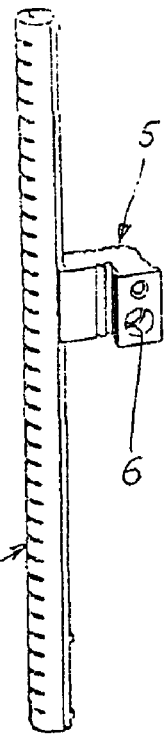
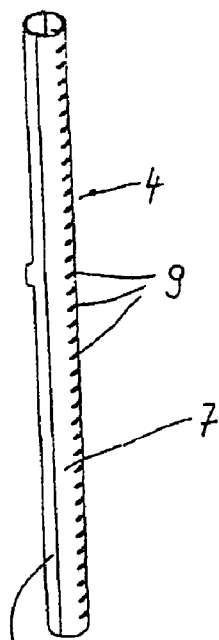
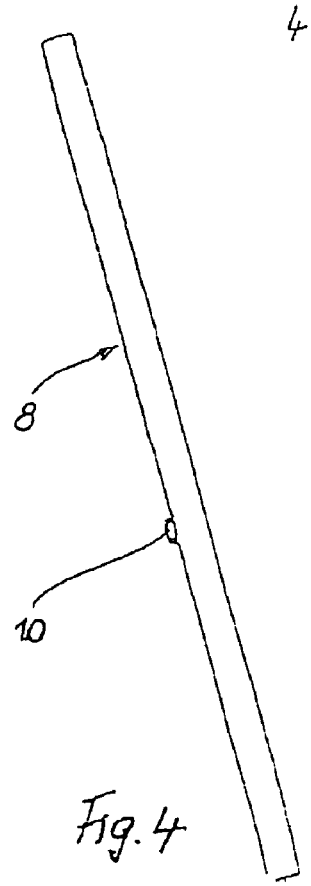
Fig. 1
Fig. 2
Fig. 3
Fig. 4

HEAT EXCHANGER COMPRISING A CONNECTION FLANGE THAT IS JOINED TO THE MANIFOLD

BACKGROUND OF THE INVENTION

The invention relates to a heat exchanger, in particular a condenser for an air conditioning system of a motor vehicle.

Condensers for air conditioning systems, as are disclosed for example by EP-A 915 308, have a coolant flowing through them, said coolant entering the condenser via a coolant connecting flange and leaving the condenser again via a further coolant flange. The connecting flanges have a continuous coolant duct which is connected, on the one hand, to a collecting tube of the condenser and, on the other hand, to a coolant inlet line or coolant outlet line. The entire condenser, composed essentially of a tube/rib block, the collecting tubes and the connecting flanges, is soldered in one operation in a soldering oven. For this purpose, it is necessary for the connecting flanges for the soldering process to be secured to the collecting tubes. Hitherto this was done by means of additional parts or soldering devices which has delayed the fabrication process.

A two-part connecting flange for attaching a coolant line to a condenser has been disclosed by U.S. Pat. No. 5,163,716. The condenser has a collecting box with a planar connecting face onto which a cuboid connecting block is fitted and is soldered to the collecting box. A coolant line is welded to an adaptor piece which is screwed to the connecting block. The coolant connection from the coolant line is made via the adaptor and a coolant duct in the connecting block. This coolant connection has a plurality of parts and mounting steps and is therefore associated with relatively high manufacturing costs.

EP-A 1 167 897 has disclosed a soldered flat tube condenser with two collecting tubes and one collector which is arranged parallel to one of the collecting tubes and is connected on the coolant side to this collecting tube by means of a connecting block with two connecting ducts. Coolant flows out of the condenser into the collector and back again into the condenser from the collector via this connecting block which is soldered to the collecting tube of the condenser. The connecting block has connectors, which are each extensions of the coolant connecting ducts and are inserted into openings in the collecting tube and secured thereto by tack welding or interference fitting. The parts are then soldered. Subsequent to the soldering process, the collecting container is screwed to the connecting block and sealed with respect to it. The collecting container is additionally connected in its upper region to the collecting tube by means of a clamp. The connecting block is thus a connecting and attachment part between the collecting tube and collecting container. The coolant lines are connected, in a way which is not illustrated, to the collecting tubes via an inlet flange and an outlet flange.

SUMMARY OF THE INVENTION

An object of the present invention is to improve the heat exchanger mentioned at the beginning to the effect that a connecting flange is constructed from a small number of individual components and can be secured easily with respect to the collecting tube for the soldering process and can, if appropriate, be soldered to the heat exchanger in one operation.

The invention provides for the connecting flange to be secured in a positively locking fashion with respect to the collecting tube by means of a connector, i.e. the connecting flange does not require any other components for securing purposes before the soldering process. The entire heat exchanger can thus be soldered to the connecting flange in a soldering oven.

According to one advantageous refinement of the invention, the connector is arranged on the collecting tube and is preferably formed from the collecting tube. It is advantageous if the collecting tube is of two-part construction, i.e. is composed of a bottom and a lid from which the connector can easily be formed, in a similar way to a passage. A corresponding receiving opening, which is also adapted to the round shape of the lid, is provided in the coolant connecting flange—said receiving opening receiving the connector in a positively locking and also frictionally locking fashion so that the two parts are secured.

According to a further, particularly advantageous refinement of the invention, the connector is arranged on the connecting flange and is preferably constructed in one piece with the connecting flange. The connecting flange can thus easily be placed on the collecting tube, which may either be of single-part or two-part construction, and inserted into a corresponding opening and this is sufficient to secure the connecting flange. In one advantageous refinement, the connector projects into the interior of the collecting tube and forms an excess length there which can be widened with respect to the opening in the collector tube. This improves the securing effect. Therefore, basically only two parts are necessary to secure the connecting flange and collecting tube, i.e. there is no need for any further securing means or parts. This simplifies the manufacturing and mounting process.

In one advantageous refinement of the invention, a further support face is also provided on the connecting flange, specifically at a distance from the connector. The support face is adapted to the rounded shape of the collecting tube or its lid and therefore fits snuggly against its surface. As a result, improved support of the connecting flange with respect to the collecting tube is obtained, specifically both before the soldering process and after the soldering process because the flange is soldered to the collecting tube in the region of this second bearing face.

In a further refinement of the invention, a blind hole bore is provided in the connecting flange and said blind hole bore can receive, for example, a holding element for attaching additional parts or a bearing pin for supporting the heat exchanger.

BRIEF DESCRIPTION OF THE DRAWINGS

Exemplary embodiments of the invention are illustrated in the drawings and will be described in more detail below. In the drawings:

FIG. 1 shows a condenser with a coolant connecting flange,

FIG. 2 shows a collecting tube of the condenser with a coolant connecting flange, FIG. 3 shows the collecting tube of the condenser without a coolant connecting flange, FIG. 4 shows a lid of the collecting tube.

DETAILED DESCRIPTION OF PREFERRED EMBODIMENTS

Figure 5:
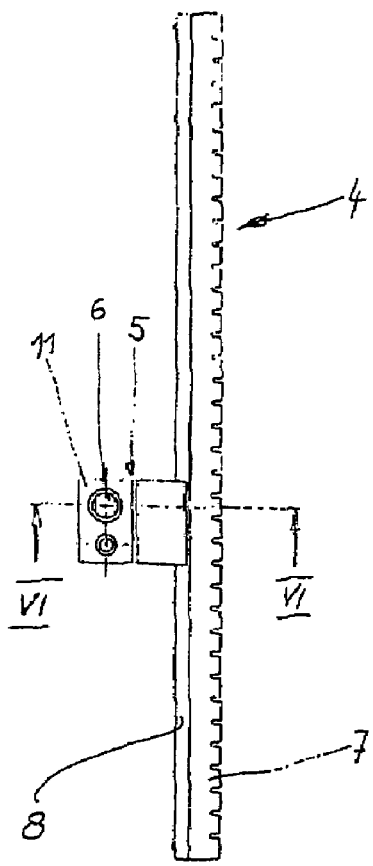
FIG. 5 shows a further view of the collecting tube with a coolant connecting flange.

FIG. 1 shows a coolant condenser 1 which is composed of a tube/rib block 2 and laterally arranged collecting tubes 3, 4. The tube/rib block 2 is constructed from flat tubes (not illustrated in more detail) and corrugated ribs arranged between them. The ends of the flat tubes are received in passages of the collecting tubes 3, 4. The entire condenser 1, composed of flat tubes, corrugated ribs and collecting tubes 3, 4, is soldered in a soldering oven. A coolant connecting flange 5 is attached to the collecting tube 4 and a coolant line (not illustrated) can be connected to said coolant connecting flange 5. A further connecting flange for a second coolant line is not illustrated here.

FIG. 2 shows the collecting tube 4 with the coolant connecting flange 5 in a somewhat enlarged representation. The connecting flange 5 is, on the one hand, connected (soldered) to the collecting tube 4 in a firm and sealed fashion and has an opening 6 for the connection of a coolant inlet line or coolant outlet line (not illustrated).

FIG. 3 shows the collecting tube 4 which is of two-part construction and is composed of a shell-shaped bottom 7 and a shell-shaped lid 8. The bottom has a series of passages 9 in which the abovementioned tubes are inserted.

FIG. 4 shows the lid 8 as an individual part, said lid 8 having a connector 10 in a central region. The coolant connecting flange 5 is secured to the lid 8 by means of this connector 10, and this is explained below.

FIG. 5 shows a further view of the collecting tube 4, i.e. a side view. The coolant connecting flange 5 is connected only to the lid 8 and has a planar connecting face 11 in which the coolant connecting opening 6 is arranged.

Figure 6:
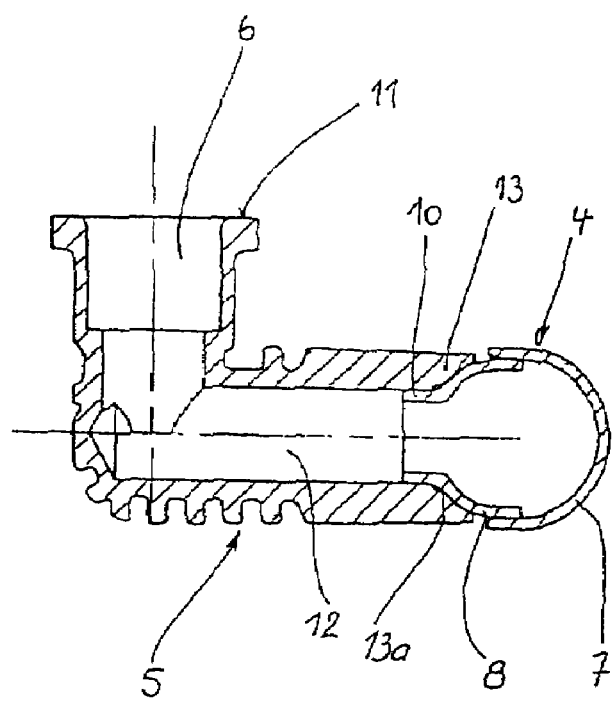
FIG. 6 shows a section along the line VI-VI in FIG. 5 through the coolant connecting flange.

FIG. 6 shows a section through the collecting tube 4 and the coolant connecting flange 5 along the section line VI-VI in FIG. 5. The coolant connecting flange 5 has an angled coolant duct 12 which communicates, on the one hand, with the collecting tube 4 and, on the other hand, with the connecting opening 6. The connector 10 is formed from the lid (half shell) 8, i.e. the connector 10 is constructed in one piece with the lid 8. Since the lid forms an individual part of the collecting tube 4, the connector 10 can easily be manufactured by punching a passage, preferably with a circular cross section. The coolant connecting flange 5 has a connecting end 13 on the collecting tube side, which connecting end 13 is, on the one hand, adapted to the contour of the lid 8 and, on the other hand, has a receiving bore 13a of the size and shape of the connector 10. The internal diameter of the receiving bore 13a and the external diameter of the connector 10 are matched to one another in such a way that a slight clamping fit is produced. The coolant connecting flange 5 is thus secured to the collecting tube 4 after said coolant connecting flange 5 has been fitted onto the connector 10 and can thus be placed with the entire condenser 1—without further resources or clamping means—in a soldering oven for the soldering process. After the soldering process, the end 13 of the connecting flange 5 is soldered to the connector 10 or to the lid 8 in a sealed and firm fashion. The connector 5 is thus also able to absorb forces which result from the attachment of a coolant line (not illustrated). From the description above it becomes clear that the coolant connecting flange 5 and the collecting tube 4 have been connected to one another in a fashion which is sealed with respect to coolant, without further parts in the form of connecting means.

Figure 7:
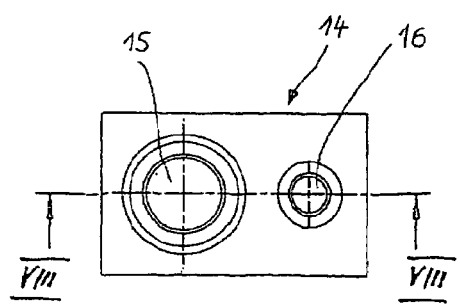
FIG. 7 shows a second embodiment of a coolant flange.

FIG. 7 shows a further exemplary embodiment of the invention, specifically a coolant connecting flange 14 in a view from above with a coolant connecting opening 15 and a blind hole bore 16.

Figure 8:
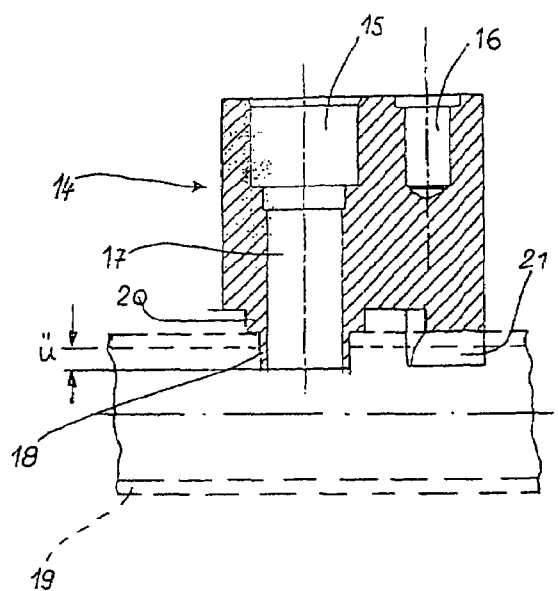
FIG. 8 shows a section along the line VIII-VIII in FIG. 7 through the coolant connecting flange.

FIG. 8 shows a section along the line VIII-VIII in FIG. 7. The coolant connecting flange 14 is manufactured from an aluminum block and has a continuous coolant duct 17 which ends in the connecting opening 15 at one end and in a connector 18 at the other. The connector 18 of the coolant connecting flange 14 is inserted into a corresponding receiving opening in a collecting tube 19 (illustrated by dashed lines). The coolant connecting flange 14 rests here with a collar 20, adjoining the connector 18 via a shoulder, on the collecting tube 19. The connecting flange 14 has, in addition to the collar 20, a further support face 21 which is adapted to the contour of the collecting tube 19. These two support faces, the collar 20 and the second support face 21, mean that the connecting flange 14 is supported doubly with respect to the collecting tube 19. The length of the connector 18 is dimensioned such that it projects into the collecting tube 19 and forms an excess length ü with the inner wall. The connector 18 can be widened conically (not illustrated) in the region of the excess length ü as a result of which better anchoring and securing of the connecting flange 14 with respect to the collecting tube 19 is achieved. The blind hole bore 16 is used to receive a pin-shaped holding element (not illustrated) to which additional parts can be attached.

Figure 9:
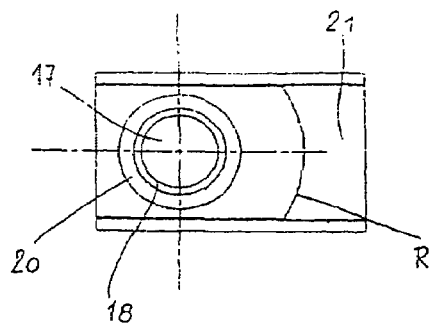
FIG. 9 shows a view of the coolant connecting flange from below.

FIG. 9 shows a view of the connecting flange 14 from below, i.e. in the direction of the coolant duct 17 and with a view of the circular support face of the collar 20 and the end face of the connector 18. Furthermore, the arched support face 21 which is stepped with a radius R can be seen.

Figure 10:
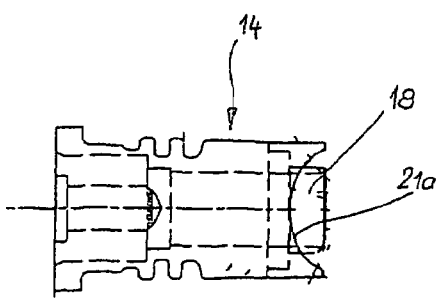
FIG. 10 shows a view of the coolant connecting flange from the side.

FIG. 10 shows the coolant connecting flange 14 from the side, it being possible to see an arcuate contour 21a of the support face 21: said contour 21a is designed to correspond to the contour of the collecting tube 19 so that closely fitting abutment between the collecting tube 19 and the support face 21 is produced in this region.

From the above description, it is in turn clear that the coolant connection 14 and the collecting tube 19 are connected to one another without further additional parts, with the connector 18 assuming the securing function. The seal-forming soldering process takes place between the external circumference of the connector 18 and the corresponding receiving opening in the collecting tube 19. The soldering process is preferably carried out in accordance with the Nocolok method.

The invention has been described using the example of a coolant condenser for an air conditioning system. However, it is to be noted that the heat exchanger according to the invention is also suitable for other application purposes.

The invention claimed is:

1. A heat exchanger for an air-conditioning system in a motor vehicle, comprising:
   a plurality of tubes;
   at least one collecting tube in communication with the plurality of tubes; and
   at least one connecting flange connected in a leak-proof manner to the at least one collecting tube at one side of the collecting tube, wherein the at least one connecting flange is configured to be connected to a line,
   wherein the at least one connecting flange and the at least one collecting tube are joined in a positive fit by a connector, wherein the connector is positioned on the collecting tube, is received in a positive fit in a receiving opening in the connecting flange, and has a flow passageway through it, wherein the connecting flange comprises a connecting end on the collecting tube side which is shaped to fit the contour of the collecting tube and a duct which communicates with the collecting tube, and wherein the duct in the connecting flange is axially aligned with the connector flow passageway.

2. The heat exchanger according to claim 1, wherein the connector projects beyond the contour of the collecting tube, and wherein the contour of the collecting tube is round.

3. The heat exchanger according to claim 1, wherein the connector is formed from the collecting tube.

4. The heat exchanger according to claim 3, wherein the collecting tube comprises a bottom shell for receiving the plurality of tubes and a cover shell, and wherein the connector is formed from the cover shell.

5. The heat exchanger according to claim 1, wherein the collecting tube and the connecting flange are brazed in an area of a contact surface between the connector and the receiving opening.

6. The heat exchanger according to claim 1, wherein the duct is angled at 90°.

7. The heat exchanger according to claim 1, wherein the connector has an arcuate cross-section.

8. The heat exchanger according to claim 7, wherein the connector has a circular cross-section.

9. The heat exchanger according to claim 1, wherein an internal diameter of the receiving opening and an external diameter of the connector are matched to one another in such a manner as to create a press or friction fit.

* * * * *